July 26, 1949.  W. J. MOHR  2,477,196
METHOD OF MAKING PRESSURE-SENSITIVE
ADHESIVE SHEETING
Filed June 12, 1945

Fig. 1

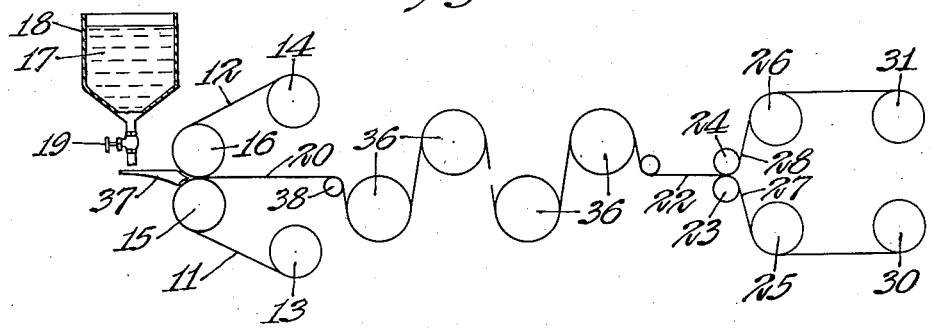

Fig. 2

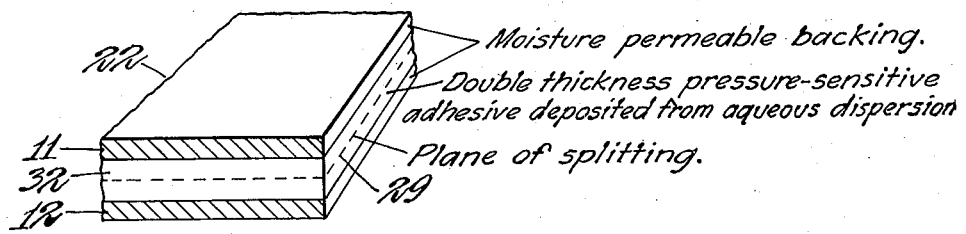

Moisture permeable backing.
Double thickness pressure-sensitive adhesive deposited from aqueous dispersion
Plane of splitting.

Fig. 3

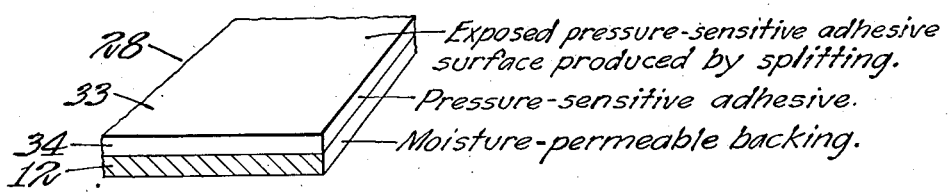

Exposed pressure-sensitive adhesive surface produced by splitting.
Pressure-sensitive adhesive.
Moisture-permeable backing.

Inventor
Wilfred J. Mohr
By Carpenter, Abbott, Coulter & Kinney
Attorneys

Patented July 26, 1949

2,477,196

UNITED STATES PATENT OFFICE 2,477,196

METHOD OF MAKING PRESSURE-SENSITIVE ADHESIVE SHEETING

Wilfred J. Mohr, Dearborn Township, Wayne County, Mich., assignor to Minnesota Mining & Manufacturing Company, St. Paul, Minn., a corporation of Delaware Application June 12, 1945, Serial No. 599,086

5 Claims. (Cl. 117—122)

This invention relates to the art of making pressure-sensitive adhesive sheets or tapes.

In the manufacture of normally tacky and pressure-sensitive adhesive sheets or tape, such as the well-known masking tape, the water-insoluble pressure-sensitive adhesive is customarily coated on the backing as a solution in a volatile organic solvent, followed by heating to remove the solvent and thus form an aggressively tacky but eucohesive pressure-sensitive adhesive coating. By "eucohesive" it is meant that the adhesive coating is more cohesive than adhesive such that offsetting or transfer of adhesive material does not result when the tape is unwound from rolls or removed from smooth surfaces to which temporarily applied, and can be handled without transfer of adhesive material to the fingers.

In the case of certain aqueous dispersions of water-insoluble pressure-sensitive adhesives, simple drying from an exposed surface of a coating of the dispersion has been found to cause a reduction in tackiness or adhesion value of the dried surface over the value obtainable on coating the same adhesive composition from an organic solvent. This effect is apparently caused by migration of water-soluble or water-carried dispersing agents, hydrophilic colloidal agglutinants, and the like, which are initially present in the aqueous phase, to the evaporative surface, where they are deposited in a non-tacky surface film on evaporation of the water. An added difficulty, particularly in the manufacture of transparent adhesive sheets or tape, is the bubbling or blistering encountered when drying the adhesive dispersion at elevated temperatures, and which results in reduced transparency.

I have now found that it is possible to apply desirably thick films of aqueous dispersions of water-insoluble normally tacky pressure-sensitive adhesives to certain tape backings in such a way as to provide entirely satisfactory aggressively and stably tacky pressure-sensitive adhesive surfaces without the formation of adhesion-masking surface residues or films. In accomplishing this novel result, I apply the water-dispersed adhesive as an intercalated layer between two moisture-permeable backing sheets, remove the water from the interior of the composite through the backing members by evaporation, and separate the two adhesive sheets thus formed by splitting the adhesive layer at its approximate center.

By coating the adhesive between two backings, I am also enabled to prevent dusting of the adhesive surface, sticking of the adhesive to other surfaces such as drying drums, racks, etc., oxidation of the surface during drying at elevated temperatures in contact with air, and other difficulties attendant upon the use of the customary methods of coating and drying. For example, I may use a plurality of steam drums for applying heat to the composite web, without allowing contact of the adhesive with the drum surfaces.

Objects of my invention are therefore to obtain a normally tacky pressure-sensitive adhesive surface from a water-dispersed water-insoluble normally tacky adhesive containing water-soluble dispersing agents and protective colloids; to obtain a pressure-sensitive adhesive coated sheet or tape by the use of water-dispersed adhesive; to obtain a pressure-sensitive adhesive coated sheet or tape having a moisture-permeable backing and a pressure-sensitive adhesive which is deposited from an aqueous dispersion, and in which the water-soluble portion is positioned towards the backing and away from the external adhesive surface; to obtain such a tape having improved bond between hydrophilic backings and adhesive by virtue of the presence of hydrophilic colloidal agglutinant at and near the interface between adhesive and backing; to avoid the use of hazardous and expensive volatile organic solvents in the coating of pressure-sensitive adhesive tapes; and to increase the efficiency of drying equipment in terms of square yards of tape or sheet material treated, by drying a double instead of a single web. Other objects are: to firm up the coated pressure-sensitive adhesive composition to the eucohesive stage by removal of the vehicle with the adhesive out of contact with the atmosphere; to provide a coated composite web which can be handled without danger of contact of the adhesive with any object to which it might become adherently attached; and to provide a method whereby prolonged heating or storage of the coated web may safely be accomplished without loss of desirable properties in the finished coated sheet or tape. Other objects will be appreciated on consideration of the specification as a whole.

The method by which I obtain my novel result will now be explained more in detail by reference to the drawings.

In the accompanying drawings:

Figure 1 is a diagram showing an illustrative system for the continuous making of pressure-sensitive adhesive sheeting according to the present invention;

Figure 2 represents the intermediate product before splitting; and

Figure 3 represents a pressure-sensitive adhesive sheet material made according to the present invention.

Referring now to Figure 1 for a more detailed description of an illustrative system adapted to the making of adhesive sheet material or tape of which the product represented by Figure 3 is an example, two moisture-permeable sheet backings 11 and 12 are unwound, under sufficient restraining tension to maintain smoothness thereof, from their respective supply rolls 13 and 14, which are rotatably mounted in parallel spaced relation. The backings 11 and 12 are drawn between squeeze rolls 15 and 16, and the aqueous dispersion of pressure-sensitive adhesive 17 is fed from the supply hopper 18 through a suitable control valve 19 to the spreading hopper 37 where it is evenly distributed between the two backings at the nip of the squeeze rolls, so as to form a layer or film of the aqueous dispersion between the backings as they are drawn through the nip, thereby forming a composite web 20 which comprises the backings 11 and 12 with the said film between them. The squeeze rolls are adjustable so as to regulate the thickness of the film confined between the two backings. The composite web 20 is then drawn over guide rolls 38 and thence over a plurality of steam cans 36 where the aqueous vehicle of the dispersion is removed at an elevated temperature by migration through, and evaporation from, the backings to form the dried composite web 22, which is shown in detail in Figure 2, and which comprises backings 11 and 12 with the intervening layer 32 of pressure-sensitive adhesive. The dried composite sheet 22 while still warm is passed between the separating rolls 23 and 24, where it is then separated by drawing the two backings 11 and 12, back around their respective separating rolls 23 and 24 and over their respective pull drums 25 and 26. The central adhesive layer 32 is thereby split along an approximate plane as indicated by the dotted line 29 of Figure 2, each of the backings 11 and 12 being left coated with a portion (here shown as approximately half) of the thickness of the initial dried adhesive layer 32 to form the two pressure-sensitive adhesive sheets 27 and 28 respectively. Tension on the two adhesive-coated sheets 27 and 28, as applied thereto by the mechanically driven pull drums 25 and 26, is sufficient to overcome the restraining tension applied to the backings 11 and 12 at the supply rolls 13 and 14, to draw the composite web 20 between the squeeze rolls and over the steam cans and to split the warm layer of dried adhesive.

The pressure-sensitive adhesive coated sheets or webs 27 and 28 thus produced are drawn from the pull drums 25 and 26 by a relatively light tension supplied by the wind-up rolls 30 and 31 respectively, on which they are wound to form stock rolls which latter may subsequently be slit and wound into rolls of tape ready for use.

Figure 3 shows adhesive sheet 28, one of the resultant adhesive sheets obtained on splitting the intermediate product 22 along a central plane 29, and comprising backing 12 and adhesive layer 34. Said adhesive layer 34 as here shown, represents approximately one-half of original adhesive layer 32. The exposed surface 33 of adhesive layer 34 is normally tacky and pressure-sensitive.

As suitable moisture-permeable backings for use with water-dispersed pressure-sensitive adhesive compositions in my novel process I may use regenerated cellulose film ("cellophane"), untreated cloth, paper suitably unified with impregnating agents, or the like. For example, absorbent creped sulfate Kraft paper unified with flexibilized glue, as described in U. S. Patent No. 1,760,820 issued to R. G. Drew may be used; or any other backing may be used which is sufficiently moisture-permeable to permit removal of moisture from the adhesive through the backing, and which has such other necessary qualifications of tensile strength, resistance to splitting, etc. as may be required.

Another type of backing which may be similarly used in my novel process is the unified paper backing disclosed by R. G. Drew in U. S. Patent No. 2,236,527, which may consist of a creped toweling paper impregnated with a solution of broken-down rubber, rosin, zinc oxide, and antioxidant, dried to remove the solvent, and sized on the back surface with shellac. Such a sheet is somewhat resistant to the passage of moisture vapor, which will increase the time required for drying of the composite web.

Where the resulting adhesive sheet is not to be placed against its own backing, but for example is to be kept in sheet form on a liner or otherwise, an untreated fibrous backing may conveniently be used; or a fibrous backing such as paper may be lightly treated so as to increase its "wet strength" without actually achieving unification of the sheet. Such a backing may advantageously be printed or otherwise marked or decorated before the application of the adhesive. Where untreated papers are used, they must be so selected as to possess sufficient resistance to tearing or splitting so that they will not fail in either of these respects during the splitting of the softened adhesive layer. However, it is possible to obtain at least partial unification and strengthening of the untreated paper by means of the adhesive composition itself, as for example by the use of a sufficiently fluid dispersion which will penetrate the paper as well as form the layer 32 of dried adhesive. Suitable sizing solutions may then be applied to the back side of the completed tape after drying and either before or after splitting.

The adhesive used in my process may consist of a rubber or reclaimed rubber and resin base type of pressure-sensitive adhesive; or the base may be a synthetic rubber such as polyisobutylene, or a synthetic resin polymer such as an alkyd resin made, for example, from castor oil and citric acid; or any of the various well-known types of pressure-sensitive adhesives which are dispersible in water may be used. Included also are pressure-sensitive adhesives formd by emulsion polymerization of suitable monomeric substances or mixtures such as certain esters of acrylic or methacrylic acid, vinyl acetate, and the like; for example, methyl acrylate, hexyl acrylate, and diallyl succinate may be inter-polymerized in emulsion form to produce a suitable water-dispersed pressure-sensitive adhesive. Partially reacted condensation or polymerization type adhesives may be employed, and the reaction completed during or following the heating and drying of the coated composite sheet and preferably prior to splitting. These various adhesives are normally firm and coherent, but at elevated temperatures are sufficiently softened so that they may be readily split.

The process of splitting may best be accomplished while the composite, after drying, is still at an elevated temperature, as disclosed above; or, for some adhesives, additional heat may be applied as by the use of internally heated separating rolls at 23 and 24 in Figure 1, or by enclosing the separating rolls 23 and 24 within a heated oven, or by preheating the composite web by radiation just prior to splitting, or by other means. The tape may if desired be artificially cooled during its passage from the point of splitting to its point of contact with the pull drum, for example by passing through a blast of cold air, so as to be in the firm and coherent state before being wound up in roll form.

Another method of obtaining splitting of the adhesive layer which is contemplated by me as a satisfactory alternative method of procedure, consists in the incorporation into the original adhesive of a small amount of an organic solvent or softener for the adhesive which is either less volatile or less readily removed from the adhesive mass than is the water of the dispersion. Relatively small amounts of such solvent are sufficient to soften the adhesive mass sufficiently so that it may readily be split, particularly at slightly elevated temperatures, to form two equally effective adhesive tapes when manipulated according to the method previously explained. The small amount of residual solvent remaining in the adhesive is readily removed, after the splitting operation has been performed, either by further brief heating or by exposure to the atmosphere for a sufficient length of time before winding the coated sheet into roll form.

As a specific example of a water-dispersed pressure-sensitive adhesive suitable for use in the process of my invention, I may employ the following, in which all parts are by weight.

Example

| | |
|---|---:|
| Reclaimed rubber | 1000 |
| Antioxidant | 5 |
| Ester gum | 200 |
| Pure hydrocarbon thermoplastic terpene resin | 110 |
| Linseed oil free fatty acids | 45 |
| Casein solution | 190 |
| Ammonium hydroxide (28% NH₃) | 45 |
| Water | 800 |

In this formula, the reclaimed rubber may be a light gray carcass reclaim containing 50% rubber hydrocarbon, having an ash content of 44.48% and a specific gravity of 1.37, such as produced by the Philadelphia Rubber Works, Akron, Ohio, under their designation "No. 6824 Reclaim". A condensation product of acetone and aniline may be used as the antioxidant; such a product is obtainable from the Monsanto Chemical Co. under the trade-name "Flectol H". "Piccolyte S-30" is a pure hydrocarbon thermoplastic terpene resin having a zero acid number and a softening point of about 30° C., sold by Pennsylvania Industrial Chemical Corp., of Clairton, Pennsylvania, and which is suitable for use in the above composition. The casein solution is made by dissolving 900 parts of dry powdered casein in 2700 parts of water to which 90 parts of penta-chlor phenol (such as "Dowicide G", obtained from the Dow Chemical Co.) may be added as a preservative, solution being obtained by the addition to the casein-and-water slurry of 45 parts of ammonium hydroxide containing 28% NH₃.

In preparing the water-dispersed adhesive, the anti-oxidant is first milled into the reclaimed rubber. To this are then added the resinous constituents, the oil acids, and finally the casein solution, mixing being accomplished in a heavy-duty internal mixer. The ammonium hydroxide is then slowly added, followed by the water. Inversion to an oil-in-water type emulsion is obtained after the addition of a minor proportion of the water; the balance of the water may then be added more rapidly to dilute the mix to a usable viscosity.

In place of all or part of the casein, various other hydrophilic colloidal agglutinants may be used: examples are polyvinyl alcohol, isinglass, gelatine, soy bean protein glues, "Mazein" (corn prolamine), dextrin, methyl cellulose, water-soluble polyhydric-alcohol/polybasic-acid resin, urea-aldehyde resin, water-soluble alkyd resin salt, or mixtures thereof. These materials act as protective colloids and assist in forming the dispersion; in addition, they afford a means of obtaining a firm bond to hydrophilic moisture-permeable backings.

The water-dispersed adhesive of the foregoing example was coated between two webs of creped kraft paper previously unified with glycerine-plasticized glue, in a thickness sufficient to provide a total of 40-48 grains of dry adhesive per 24 square inches of the composite. After drying at 160 F., it was split at the same temperature, cooled slightly, and wound up to produce two finished rolls of pressure-sensitive adhesive tape. When slit into narrow widths and tested, this tape showed satisfactory adhesion to various surfaces and was suitable for use as a masking tape. When a single coat of the same dispersed adhesive, to the extent of 20-24 grains per 24 square inches, (dry weight), was applied to a single web of the same type of backing and dried at 160°, the exposed dried surface was found to be almost entirely tack-free.

During the evaporation of the water from the composite web, it seems likely that soluble materials such as soap, and the casein or other protective colloid when present in the dispersion, are carried to the pervious backing and may even be carried to the evaporative outer surface. A concentration of water-soluble materials must thereby take place at or in the backing, and this must result in a concentration of water-insoluble and adhesive materials in the center layer. This gradation of soluble and insoluble materials may be the explanation of the improved adhesion of the adhesive surface to other surfaces, and also the highly satisfactory bond between adhesive layer and hydrophilic treated backing, which are obtained by my novel process.

By maintaining equal tension on the pull drums 25 and 26, and thereby maintaining equal angles between each of the pressure-sensitive adhesive sheets 27 and 28 and the composite web 22 as the adhesive layer is split, and also by carefully controlling the distribution of temperature within said composite web 22, it is possible to obtain essentially equal weights of adhesive on each of the said sheets 27 and 28. Where backings 11 and 12 are of identical construction, and where there is to be produced but a single type of adhesive sheet, the above-named conditions are desirable. Splitting of the adhesive along a plane located toward either side of the central plane 19 shown in Figure 2 may, however, be obtained when desired, for example by differential heating or cooling of the two surfaces of composite web 22 so as to provide a plane at maximum temperature which is removed from the central plane, or by unequal tension applied by the pull drums 25 and 26, or by use of dissimilar backings which for example are of different thickness.

As previously indicated, the composite web 22 may be split by direct application of tension without the use of the separating rolls 23 and 24 of Figure 1. Such an arrangement usually requires the web to be moved forward by additional driving means; for example, one or more of the drying drums 36 of Figure 4 may be mechanically driven.

It will of course be obvious that the coating and drying operation, and the splitting operation, may be accomplished separately. Thus the composite web 22 may be wound up in a roll for temporary storage, and may later be unwound, reheated as by one of the methods previously indicated, and split.

The freshly exposed adhesive surfaces formed on splitting adhesive layer 32 of Figure 2, such as the surface 33 in Figure 3, are ordinarily not smooth; but their contact under tension with the smooth surfaces of the pull drums 25 or 26, and the further pressure of the adhesive against the outer surface of the backing when the tape is in roll form, frequently makes the adhesive surface appreciably smoother than it was immediately after the splitting operation.

Heating on steam cans has been disclosed in connection with Figure 1 as a method of removing the volatile vehicle from the composite coated sheet. Where the backing carries a thermoplastic backsize, for example the shellac backsize of the paper backing of the Drew Patent No. 2,236,527 previously mentioned, it may be necessary to avoid contact of the backing with hot metal surfaces; in such cases, and also under various other conditions, it may be desirable to dry the composite sheet in an oven. The sheet may be suspended in loops, in which case an additional pull drum may be found necessary to pull the sheet through the squeeze rolls; or it may be passed through the oven under continuous slight tension and in single or multiple pass.

While the water-dispersed adhesive is conveniently applied by the method shown in Figure 1 and previously described, it may also be applied in any of several other known methods so long as all, or essentially all, of the evaporation of water is allowed to take place through the porous backing and not from the exposed adhesive surface. For example, a film of dispersed adhesive may be laid on each backing member separately, and the two combined to form the composite; or the adhesive may be applied to but one of the backing members, and subsequently covered with the other member prior to evaporation of solvent. While the use of squeeze rolls is desirable, other means of coating or spreading the dispersed adhesive and of forming the composite web 20 may be employed; for example, spreader bars may be used.

There is thus provided a new method for the production of pressure-sensitive adhesive sheets or tapes, in which the pressure-sensitive composition is firmed up from the initial fluid coatable state to, or nearly to, the final desired firm and coherent state while held between two backing members, which are later separated under conditions such that the adhesive layer is centrally split to provide on each of said backings a coating, having a freshly exposed and fully adhesive surface, of normally tacky and pressure-sensitive adhesive. By this method, adhesive compositions which contain mobile tackiness-reducing substances may be made to provide full adhesion value. Likewise, adhesive compositions which are subject to oxidation by air at elevated temperatures to non-tacky products may safely be subjected to such temperatures during the firming operation without loss of tack. Combinations of backings and adhesive compositions may be used which, if combined by previously known methods, would result in badly curled, broken, stretched, or otherwise deformed and useless coated products. Furthermore, a method is provided of holding pressure-sensitive adhesive coated backings in storage for long periods of time without deterioration of the adhesive surface by surface oxidation, collection of dust, or the like, and without any necessity for the use of a removable liner or slip-sheet.

What I claim is as follows:

1. In a method of making normally tacky and pressure-sensitive adhesive sheets and tapes, the steps comprising applying an intercalated layer of an aqueous dispersion of water-insoluble normally tacky pressure-sensitive adhesive composition containing a hydrophilic colloidal agglutinant between two moisture-permeable flexible tape backing members, removing the aqueous vehicle through and from the exposed surfaces of said backing members, and splitting the dried layer of adhesive.

2. In a method of making normally tacky and pressure-sensitive adhesive sheets and tapes, the steps comprising applying an intercalated layer of an aqueous dispersion of water-insoluble normally tacky pressure-sensitive adhesive composition containing a hydrophilic colloidal agglutinant between two hydrophilic moisture-permeable flexible tape backing members, removing the aqueous vehicle through and from the exposed surfaces of said backing members, and splitting the dried layer of adhesive.

3. In a method of making normally tacky and pressure-sensitive adhesive sheets and tapes, the steps comprising applying an intercalated layer of an aqueous dispersion of water-insoluble normally tacky pressure-sensitive adhesive composition containing a hydrophilic colloidal agglutinant between two moisture-permeable flexible tape backing members, removing the aqueous vehicle by evaporation from the exposed outer surfaces of said backing members, and splitting the dried layer of adhesive at an elevated temperature, said adhesive being of a type which softens on heating.

4. In a method of making normally tacky and pressure-sensitive adhesive sheets and tapes, the steps comprising applying an intercalated layer of an aqueous dispersion of water-insoluble normally tacky pressure-sensitive adhesive composition containing a hydrophilic colloidal agglutinant between two unified paper moisture-permeable flexible tape backing members, removing the aqueous vehicle through and from the exposed surfaces of said backing members, and splitting the dried layer of adhesive.

5. In a method of making normally tacky and pressure-sensitive adhesive sheets and tapes, the steps comprising applying an intercalated layer of an aqueous dispersion of water-insoluble normally tacky pressure-sensitive adhesive composition, containing a hydrophilic colloidal agglutinant and a small amount of an organic solvent, between two moisture-permeable flexible tape backing members, removing the aqueous vehicle through and from the exposed surfaces of said backing members, splitting the resulting adhesive layer, and removing the organic solvent by subsequent evaporation.

WILFRED J. MOHR.

REFERENCES CITED

The following references are of record in the file of this patent:

UNITED STATES PATENTS

| Number | Name | Date |
|---|---|---|
| 1,882,714 | Angier et al. | Oct. 18, 1932 |